(12) United States Patent
Coy et al.

(10) Patent No.: US 8,027,457 B1
(45) Date of Patent: Sep. 27, 2011

(54) PROCESS FOR AUTOMATED DEPLOYMENT OF NATURAL LANGUAGE

(76) Inventors: Cordell Coy, Villa Hills, KY (US); Joseph Combs, Harrison, OH (US)

( * ) Notice: Subject to any disclaimer, the term of this patent is extended or adjusted under 35 U.S.C. 154(b) by 1334 days.

(21) Appl. No.: 11/565,702

(22) Filed: Dec. 1, 2006

Related U.S. Application Data

(60) Provisional application No. 60/741,291, filed on Dec. 1, 2005.

(51) Int. Cl.
*H04M 3/00* (2006.01)
*H04M 5/00* (2006.01)

(52) U.S. Cl. ............... 379/265.09; 379/265.01; 704/244

(58) Field of Classification Search .................. 370/401, 370/352; 704/244, 246–257; 705/7; 379/265.09, 379/265, 266
See application file for complete search history.

(56) References Cited

U.S. PATENT DOCUMENTS

| | | | |
|---|---|---|---|
| 6,370,437 B1 | 4/2002 | Carter et al. | |
| 6,446,261 B1 | 9/2002 | Rosser | |
| 6,614,885 B2 | 9/2003 | Polcyn | |
| 6,870,848 B1* | 3/2005 | Prokop | 370/395.2 |
| 6,895,083 B1* | 5/2005 | Bers et al. | 379/88.01 |
| 7,082,422 B1* | 7/2006 | Zirngibl et al. | 706/45 |
| 7,254,641 B2 | 8/2007 | Broughton et al. | |
| 7,274,685 B1* | 9/2007 | Peters | 370/352 |
| 7,660,715 B1* | 2/2010 | Thambiratnam | 704/244 |
| 7,711,104 B1* | 5/2010 | Flockhart et al. | 379/265.03 |
| 2003/0004719 A1* | 1/2003 | Yuschik | 704/246 |
| 2003/0059016 A1* | 3/2003 | Lieberman et al. | 379/201.03 |
| 2004/0141508 A1* | 7/2004 | Schoeneberger et al. | 370/401 |
| 2005/0002502 A1* | 1/2005 | Cloran | 379/88.18 |
| 2005/0041793 A1* | 2/2005 | Fulton et al. | 379/211.01 |
| 2005/0240455 A1* | 10/2005 | Walters et al. | 705/7 |
| 2006/0023863 A1* | 2/2006 | Joseph et al. | 379/265.02 |
| 2006/0026049 A1* | 2/2006 | Joseph et al. | 705/8 |
| 2006/0074670 A1* | 4/2006 | Weng et al. | 704/257 |
| 2006/0109975 A1* | 5/2006 | Judkins et al. | 379/265.02 |
| 2006/0115070 A1* | 6/2006 | Bushey et al. | 379/265.02 |
| 2006/0153345 A1* | 7/2006 | Bushey et al. | 379/88.01 |
| 2007/0036332 A1* | 2/2007 | Busayapongchai | 379/265.09 |
| 2008/0034354 A1 | 2/2008 | Brughton et al. | |
| 2009/0003584 A1* | 1/2009 | Walker et al. | 379/265.09 |

OTHER PUBLICATIONS

Office Action dated Oct. 3, 2008 for U.S. Appl. No. 11/076,602.
Office Action dated Mar. 2, 2006 for U.S. Appl. No. 11/276,497.
Office Action dated Apr. 17, 2009 for U.S. Appl. No. 09/944,676.
Office Action dated May 14, 2009 for U.S. Appl. No. 11/291,562.

\* cited by examiner

*Primary Examiner* — Ahmad Matar
*Assistant Examiner* — Kharye Pope
(74) *Attorney, Agent, or Firm* — Frost Brown Todd LLC; William S. Morriss

(57) ABSTRACT

There is disclosed a system and method for monitoring and updating an interactive voice response system through the use of a human agent who reviews the responses provided by a computer system and makes recommendations which are then used as data for updating the interactive voice response system. There is further disclosed a user interface for allowing the human agent to review the responses provided by the computer system, and to provide alternate responses which could be implemented by the computer system.

15 Claims, 4 Drawing Sheets

Figure 2

Current Prompt: 200

How may I help you?

Recognition Result: 201

(noinput)

203 → | NO RESPONSE | NO MATCH | REPEAT THAT | OPERATOR |

Destination  202  Clarification

| Website Support | Nearest Location | Technical Support |
| Standalone Software | Sales/Marketing |
| Order Supplies | Employment |

204

Remarks: 205

| IRATE CALLER | HEAVY ACCENT | EMPLOYEE |

206

Data connection to IVR Port 3

Figure 2A

Current Prompt: 200A

How may I help you?

Recognition Result: 201A

I'm having trouble printing reports.

| NO RESPONSE | NO MATCH | REPEAT THAT | OPERATOR |

202A

Destination　　　　　　　　　　　　　　Clarification

| Website Support | Nearest Location | Technical Support | ←203A |
| Standalone Software | Sales/Marketing |
| Order Supplies | Employment |

204A

Remarks: 205A

| IRATE CALLER | HEAVY ACCENT | EMPLOYEE |

206A

Data connection to IVR Port 3

US 8,027,457 B1

PROCESS FOR AUTOMATED DEPLOYMENT OF NATURAL LANGUAGE

CROSS REFERENCE TO RELATED APPLICATIONS

The present application claims the benefit of the U.S. Provisional Patent Application Ser. No. 60/741,291, filed Dec. 1, 2005, the disclosure of which is hereby incorporated by reference in its entirety.

FIELD OF THE INVENTION

This invention is in the field of creating computerized systems and machine learning.

BACKGROUND

Commonly, interactive voice response systems (IVR) are created through a combined use of software and human input. One technique is for a business to set up a human operated system disguised as an automated system to handle interactions with callers. The business then observes how callers interact with the human operated system, and builds an actual automated system based on those observations. Such a technique is generally referred to as using a "Wizard of Oz" system, because a human input is hidden from callers behind a façade of automation.

Current Wizard of Oz systems have many drawbacks which decrease their overall efficiency. For example, a business is forced to build the human operated system from the ground up in order to begin the process. Additionally, current Wizard of Oz systems deploy the human and automated systems in sequence. Therefore, it is not possible to directly compare the decisions made by human systems with decisions made by the automated systems being designed. Further, it can often be difficult to effectively sort through the data created during caller interactions with the human system to know what interactions will be most problematic for the automated system and how those interactions should be dealt with. The teachings of this application can be used to help address one or more of those problems with present Wizard of Oz technology, as well as providing other benefits which are apparent in light of the disclosure contained herein.

SUMMARY

Included within the scope of this application is a computer implemented method comprising the steps of receiving a statement at an automated response system; determining a plurality of responses to the statement, at least one response from the plurality of responses being determined automatically; implementing a first response to the statement, said first response having been selected from the plurality of responses; storing data comprising the plurality of responses; and, selectively identifying the stored data based at least in part on a second response from the plurality of responses.

For the purpose of clarity, the description of that method should be understood as follows. First, the term "step" should be understood to refer to any action, measure, or process which might be taken to achieve a goal. It should further be understood that, unless an order is explicitly set forth as "necessary" through the use of that word, "steps" are not limited to being performed in the order in which they are presented, and can be performed in any order, or in parallel. Second, the verb "receive" (and the various forms thereof) should be understood to refer to the act of getting something. As a non-limiting example of "receiving," if a customer made a statement over a telephone line to an IVR, when the signal representing that statement reaches the IVR, the IVR could be described as having "received" the statement. Third, the term "statement" should be understood to refer to any expression of information. Non-limiting examples of "statements" include verbal "statements" such as the assertion "can't use your product" or the questions "How do I print from your web site?" and "huh?", as well as nonverbal "statements" such as information conveyed using text, diagrams, and/or actions. Fourth, the phrase "automated response system" should be understood to refer to a system which is operable to supply a response based in part on the use of a computer or other device. Fifth, the term "response" should be understood to refer to an act taken, or definition of an act which could be taken, based at least in part on a particular input. Non-limiting examples of "responses" in the context of an interaction between a caller and an IVR (which is a non-limiting example of an automated response system) include the IVR's spoken messages to the caller (e.g., C: "I want to close my account," IVR: "Please specify your account number"), as well as actions the IVR takes based on caller input (e.g., transferring a caller to the billing department after the customer states that he would like to receive a copy of his most recent invoice). Sixth, the verb "determine" (and the various forms thereof) should be understood to mean generating, selecting or otherwise specifying something. Seventh, the verb "implement" (and the various forms thereof), in the context of a "response," should be understood to refer to putting the response into effect. As a non-limiting example demonstrating how an implemented response might differ from a non-implemented response, when an IVR receives a statement from a caller, the IVR might determine that the response to that statement should be to put the caller on hold. However, before putting the caller on hold, the IVR might request input from some external system regarding how the statement should be processed, and be instructed that the caller should be transferred to a human agent immediately rather than put on hold. If the IVR then transferred the caller to a human agent, transferring the caller would be the implemented response, while putting the caller on hold would be a non-implemented response. Eighth, the verb "identify" (and various forms thereof), should be understood to refer to marking, setting aside, or otherwise distinguishing the thing being identified. Thus, to provide a non-limiting, illustrative example, data which is saved in a way that distinguishes it as having some property, or in a way that distinguishes it relative to other data, would be said to be "identified." It should be understood that "identifying" data does not necessarily involve altering that data, such as by appending information or moving that data to a particular location. For example, in a routine which constructs a table indicating where in memory data having certain properties is stored, that data would be said to be "identified" because it could be later distinguished by use of the table, even though the data itself might not be altered in any way. Ninth, the verb "select" (and various forms thereof), when used in this context, should be understood to refer to making a choice based on some quality of the thing chosen. Certain non-limiting examples of qualities which could be used as the basis for selection include seniority, subject matter expertise, average call disposition time, and availability. Tenth, the verb "store" (and various forms thereof), should be understood to refer to any act of preserving or maintaining, however brief in duration that act might be. Eleventh, the term "data" should be understood to refer to information which is represented in a form which is capable of being processed, stored and/or transmitted. Finally, the phrase "selectively identifying"

should be understood to refer to the act of making an identification based at least in part on some characteristic of the things being identified.

To provide further elaboration on the above paragraph, a method, such as that described above, in which at least one response from the plurality of responses was determined by a live agent would be within the scope of this application. Similarly, a method, such as described in the preceding paragraph, in which selectively identifying takes place automatically, and a method, such as described previously, wherein selectively identifying the stored data comprises altering the stored data, would both fall within the scope of this application. For the purpose of clarity, the phrase "live agent" should be understood to refer to an agent which is alive, while an "agent" should be understood to refer to any entity (natural or otherwise) which is able or authorized to perform one or more acts. Similarly, the adverb automatically should be understood to indicate that the act represented by the verb being modified is being done by a device, such as a computer. Additionally, the verb "alter" (and various forms thereof) should be understood to refer to an act of changing, making different, or modifying the thing being "altered."

Additionally, in some methods in which selectively identifying stored data comprises altering the stored data, altering the stored data might comprise moving the stored data, or it might comprise augmenting the stored data. For the purpose of clarity, in this context, the verb "move" (and various forms thereof) should be understood to refer to an act of changing something from one position to another. A non-limiting example of such "moving" would be to "move" data in a file by saving that data in a file with a different file name. For additional clarification, the verb "augment," when used in the context of data, should be understood to refer to adding additional data to the data being "augmented." A non-limiting example of such augmenting would be to append a marker to the data being "augmented."

Additionally, in some methods as discussed above, the step of storing data might comprise storing data in a database comprising a plurality of records having a first field corresponding to a first response from the plurality of responses and a second field corresponding to a second response from the plurality of responses and wherein selectively identifying might comprise querying the database. In such a method where selectively identifying comprises querying the database, the query might comprise a selection of records in which the first field is different from the second field. For the purpose of clarity, the description of this paragraph should be understood as follows. First, the term "database" should be understood to refer to any collection of data stored on a computer-readable medium. Second, a "record" in the context of a database should be understood to refer to a unit of data stored in the database. Third, a "field" in the context of a record is a discrete unit of data contained within a record and having a consistent type. Fourth, in this context, a field "corresponding" to something, such as a response, is a field having a connection to that thing. For example, a field which contained the text of a verbal response would "correspond" to that response, as would a field which contained the probability that a response was the correct response. Fifth, in the context of a database, the word "query" (and variations thereof) should be understood to refer to requests and commands for the database. Sixth, the term "selection," in the context of a database query, should be understood to refer to a request to retrieve all records from a database based on some parameter. Finally the adjective "different" should be understood to refer to something which is not the same as something else. However, it should be noted that things which are not literally the same might not be "different" if they are substantively the same as one another (for example, two responses with literally different wording but the same meaning might be considered the same, as could two numeric values which where not equal, but which were still within a predefined threshold).

Yet a further method which could be practiced within the scope of this application comprises the steps of receiving a statement in the context of an interaction with an automated response systems; involving an agent in the interaction, where involving the agent comprises conferencing the agent into the interaction; receiving input from the agent; determining a response to the statement; implementing the response to the statement; and automatically determining whether to identify the response based at least in part on the input from the agent. For the sake of clarity, it should be understood that an automatic determination is not necessarily one which is done without any input from an agent. For example, in some embodiments, an agent might provide input for a device which the device could then use in determining whether to identify data. As further clarification, in this context, the term "input" should be understood to refer to any signal, data, information, act, or other thing provided the entity providing the "input." As a non-limiting example, if data from multiple natural language interactions had been created and could potentially be used to update an IVR, a systems administrator selecting data to be used for updating the interactive voice response system should be understood to be an act by the systems administrator of providing "input." The term "interaction" should be understood to refer to a plurality of acts involving two or more entities wherein at least one of the acts is based at least in part on an act which has taken place previously. Non-limiting examples of "interactions" include conversations between people, a sequence of questions from an interactive voice response system followed by answers from a customer, and the use of a self care application over the internet, wherein new web pages are displayed in response to a user's activation of one or more hyperlinks. The verb "involve" (and various forms thereof) should be understood to refer to allowing the entity being involved to receive input and take actions based on that input. The verb "conference" (and the various forms thereof), when used in the above context should be understood to refer to incorporating the entity being conferenced. A non-limiting example of conferencing is including an additional participant into a telephone interaction. Additionally, some such methods might include the acts of identifying the response, and such identification might comprise creating a record corresponding to the response.

In some methods, such as described above, which comprise involving an agent in an interaction, involving the agent in the interaction might comprise muting an audio input, and/or selecting the agent from an agent list. For the sake of clarity, the phrase "muting an audio input" (and variations thereof), should be understood to refer to preventing an audio signal from the source being muted from being, created, made available, or transmitted. Pressing the mute button on a telephone is a non-limiting example of such muting. Additionally, a "list" should be understood to refer to a group of different options to be considered, meaning that an "agent list" should be understood to refer to a group of different agents to be considered.

In addition to the methods described above, portions of this disclosure might be implemented in a computer readable medium having stored thereon computer executable instructions operable to configure a computer to: receive a first response to a statement; receive a second response to the statement; store data comprising the first response and the second response; and, if the first response and the second response are different, identify the stored data. For the purpose of clarity, the above disclosure should be understood in light of the following. First, the phrase "computer readable medium" should be read broadly to include any object, substance, or combination of objects or substances, capable of storing data or instructions in a form in which they can be retrieved and/or processed by a device. A "computer readable medium" should not be limited to any particular type or organization, and should be understood to include distributed and decentralized systems however they are physically or logically disposed, as well as storage objects of systems which are located in a defined and/or circumscribed physical and/or logical space. Second, the term "computer" should be understood to refer to any device or group of devices which is capable of performing one or more logical and/or physical operations on a data input to produce a result. Third, to "configure" a computer is to specify logical and/or physical actions which that "computer" will perform to achieve a purpose.

Of course, computer readable media within the scope of this application might have stored thereon computer executable instructions which are operable to perform additional tasks. For example, computer executable instructions might be operable to configure a computer to present an interface to an agent. For the purpose of clarity, the term "interface" should be understood to refer to a device or format capable of receiving signals from another entity. Non-limiting examples of interfaces include graphical user interfaces, such as the windows desktop, and audio interfaces, such as might be made available to an individual who called into an IVR. In the context of interfaces, the verb "present" (and various forms thereof) should be understood to refer to making the interface available.

Various types of interfaces could be used in the above context within the scope of this disclosure. For example, the interface might allow an agent to determine the second response to the statement, or the interface might be a configurable interface (or both). Additionally, or alternatively, the interface might be a graphical interface. For the purpose of understanding, a "configurable" interface should be understood to refer to an interface which can be customized to achieve a desired end. For example, an interface which presented a framework and allowed the specifics of that framework to be filled in by a customer would be a configurable interface. An interface which allowed the agent to make decisions as to how information would be presented in the interface would be another example of a configurable interface. Similarly, a "graphical" interface should be understood to be an interface which comprises visually perceptible components which can be used to present or receive signals.

Further, in addition to, or as an alternative to, the methods described above, the disclosure of this application could be implemented as a system comprising an automated interaction system, an agent terminal, a reusable intermediary system, a computerized input interpreter, and a computer readable medium. For the purpose of clarity, in this context, the following terms should be understood to have the following meanings. First, the term "automatic" (and various forms thereof) should be understood to refer to mechanistically performing a function. Second, the term, "terminal" should be understood to refer to a device for entering information into an automated system, or for receiving information from an automated system. Third, the adjective "intermediary" should be understood to indicate that the thing being described by the term "intermediary" is used to facilitate or mediate interaction between two or more individual entities, systems or devices. Fourth, the adjective "reusable" should be understood to indicate that the thing being modified by the word "reusable" is capable of performing a purpose in multiple contexts. Fifth, the term "interpreter" should be understood to refer to something which gives, provides, explains, or translates meaning associated with or contained in some input.

In a system such as that described in the preceding paragraph, the computer readable medium might have stored thereon computer executable instructions operable to perform one or more acts. For example, the computer executable instructions might be operable to configure the reusable intermediary system to allow an agent to log into the reusable intermediary system using the agent terminal; the computer executable instructions might be operable to configure the automated interaction system such that, in response to an external input, the automated interaction system sends a request to the reusable intermediary system for allocation of a resource into processing the external input; the computer executable instructions might be operable to configure the reusable intermediary system such that, in response to the request from the automated interaction system, the reusable intermediary system integrates the agent into processing the external input; the computer executable instructions might be operable to configure the automated interaction system to send a response to the external input both to the source of the external input and, through the reusable intermediary system, to the agent terminal; the computer executable instructions might be operable to configure the automated interaction system to send a second external input having the same source as the first external input to the computerized input interpreter; the computer executable instructions might be operable to configure the computerized input interpreter to send, to the automated interaction system, a first output generated in response to the second external input; the computer executable instructions might be operable to configure the automated interaction system to send the first output to the agent terminal via the reusable intermediary system; the computer executable instructions might be operable to configure the reusable intermediary system and the agent terminal such that the agent terminal allows the agent to, using the agent terminal, determine a second output based on the second external input, and such that the second output is sent from the agent terminal to the automated interaction system via the reusable intermediary system; the computer executable instructions might be operable to configure the automated interaction system to send a second response to the source of the external input based on the first output and the second output; and the computer executable instructions might be operable to, if the first output and the second output are different, update the computerized input interpreter based at least in part on the second output. Of course, the computer executable instructions might be operable to perform additional or substitute acts without departing from the scope or spirit of the invention.

For the purpose of clarity, certain words should be understood to have meanings as set forth below. First, the verb "log in" (and various forms thereof) should be understood in this context to refer to entering data or interacting with a terminal of a system in order to gain access or a connection to that system. Second, the adjective "external" (and various forms thereof) should be understood in this context to indicate that the thing being modified by the word "external" originates from outside the system. Third, the verb "send" (and various forms thereof) should be understood to refer to an entity or device making a thing available to one or more other entities or devices. It should be understood that the word sending does not imply that the entity or device sending a thing has a particular destination selected for that thing, thus, as used in this application, a message could be sent using the well known prior art method of writing the message on a piece of paper, placing the paper in a bottle, and throwing the bottle into the ocean. Of course, the above example is not intended to imply that the word sending is restricted to situations in which a destination is not known. Thus, sending a thing refers to making that thing available to one or more other devices or entities, regardless of whether those devices or entities are known or selected by sender. Fifth, the verb "allocate" (and various forms thereof) should be understood to refer to the act of setting aside for a particular purpose. Sixth, the term "resource" should be understood to refer to any thing or entity which is capable of being utilized to perform a function. Seventh, the verb "process" (and various forms thereof) should be understood in this context to refer to the act of performing one or more mathematical and/or logical operations, or performing one or more subsidiary steps on an input to obtain a result. Eighth, the verb "integrate" in the context of "integration into a process" should be understood to refer to allowing the thing being integrated into the process to perform one or more mathematical and/or logical operations or one or more subsidiary acts to achieve the result of the process. Ninth, the verb "generate" (and various forms thereof) should be understood to refer to producing, creating, or otherwise bringing something into existence. It should be understood that "generation" is not limited to "generation" ex nihilo, and that, while the verb "generate" can refer to the act of creating an entirely new thing, it can also be used to refer to creating something by transforming, combining or modifying one or more existing inputs. Tenth, the term "output," when used in the context of a system as described herein, should be understood to refer to data produced from a program or a process in reaction to one or more inputs.

Additionally, portions of this disclosure can be implemented in a method of operating a system comprising an IVR, an agent terminal, a reusable Wizard of Oz system, and an automatic speech recognizer. Such a method might comprise the steps of allowing an agent to log into the reusable Wizard of Oz system using the agent terminal; receiving a call from a caller at the IVR; in response to a request from the IVR, bridging the agent to the call; from the IVR, playing a prompt for the caller; and, sending a description of the prompt from the IVR to the agent via the reusable Wizard of Oz system and the agent terminal. For the purpose of clarity, in this context, a "Wizard of Oz system" should be understood to refer to a system in which one or more human agents are allowed to process an interaction but the involvement of the one or more human agents is concealed from at least one of the participants in the interaction. Further, in this context, an "IVR" should be understood to refer to an automated telephony system which interacts with callers who provide input which may comprise natural language input, touchtone input, or some combination of the two. Similarly, the verb "bridge" (and various forms thereof) should be understood, in this context, to refer to the act of establishing a physical or logical connection with an agent which allows an agent to process an interaction. The term "prompt" should be understood to refer to something which is provided to trigger a response from that which is provided with the prompt. The verb "play" (and various forms thereof) should be understood in this context to refer to the act of giving forth the thing played, for example, by transmitting audio data over a telephone line or data connection. The term "description" should be understood to refer to a representation of one or more significant characteristics of the thing being described. A non-limiting example of a description would be a transcription of a natural language statement, which represents the significant characteristics (words) of the statement in text format. A second non-limiting example of a description would be a patent number for an invention, which represents the legal document which can be used to protect that invention.

A method within the scope of this disclosure, such as that described in the preceding paragraph, might additionally or alternatively comprise the steps of: receiving, at the IVR, a statement from the caller; sending the statement from the IVR to the automatic speech recognizer; sending, from the automatic speech recognizer to the IVR, an interpretation of the statement; from the IVR, sending the interpretation of the statement to the agent via the reusable Wizard of Oz system and the agent terminal; allowing the agent to determine an agent interpretation of the statement via the agent terminal; sending the agent interpretation of the statement from the agent terminal to the IVR via the reusable Wizard of Oz system; based on the interpretation of the statement, determining a response to the statement from the caller; via the IVR, responding to the statement from the caller using the determined response; via the reusable Wizard of Oz system, automatically saving the interpretation of the statement and the agent interpretation of the statement; and, if the interpretation of the statement and the agent interpretation of the statement are different, updating the automatic speech recognizer with a model based on the agent interpretation of the statement. For the purpose of clarity, in this context, the term "model" should be understood to refer to a formalized representation of some complex concept or system. A non-limiting example of a model which might be used in natural language processing is a grammar.

Of course, the above discussion should be understood to be illustrative, and not exhaustive of potential implementations of this disclosure.

BRIEF DESCRIPTION OF THE DRAWINGS

FIG. 2 is a depiction of a user interface which might be presented to a human agent in some embodiments.

FIG. 2A is a depiction of a user interface which might be presented to a human agent in some embodiments.

DETAILED DESCRIPTION

All embodiments described herein are intended to be illustrative and, therefore, non-limiting.

For purposes of understanding the following discussion, the acronym VXML should be understood to mean VoiceXML which is an application of the Extensible Markup Language (XML) which is intended to standardize the description of voice applications so as to make them IVR vendor independent as well as set minimum standards for what an IVR must be able to accomplish.

Figure 1:
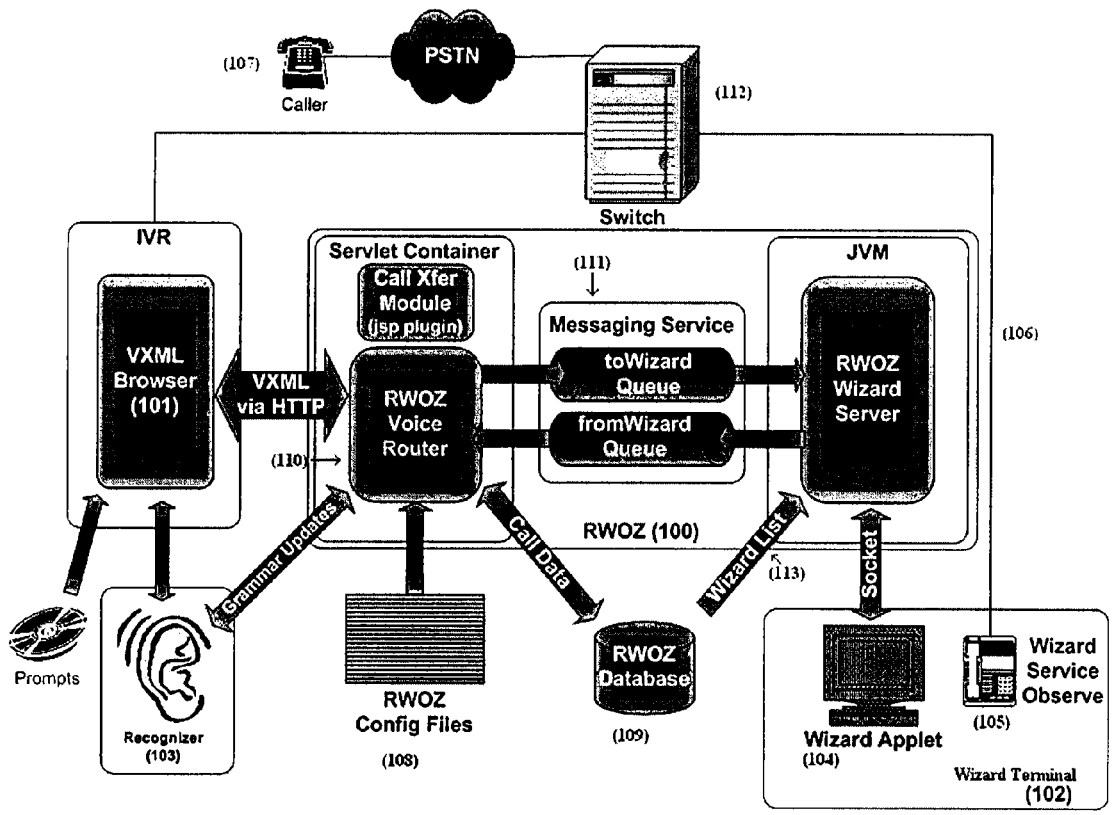
FIG. 1 is a high level diagram demonstrating the interaction of various components of an embodiment.

Turning to FIG. 1, that figure depicts a system comprising a VXML browser, a reusable Wizard of Oz system (RWOZ) (100), and a wizard terminal (102), which could be used by a business seeking to deploy an IVR system to train an automated speech recognizer (ASR or "Recognizer"). As shown in FIG. 1, the wizard terminal (102) might comprise a wizard applet (104) and/or a voice device, such as a telephone (105), a headset, or some other type of device capable of presenting natural language communication. The wizard terminal (102) might be connected to a wizard service observation line (106) which might allow an agent using the wizard terminal (102) to monitor a natural language communication. For purposes of clarity, the wizard service observation line (106) should be understood to refer to any data connection which can be used to allow a natural language statement to be communicated to the agent. Additionally, the wizard applet (104) should be understood to refer to any combination of software and hardware which can allow an agent to indicate a response to a natural language statement. Thus, a non-limiting example of a wizard applet (104) might be a computer program which allows an agent to indicate an action the IVR system should take in response to a statement by a caller (107).

In some embodiments, the RWOZ (100) might utilize data stored in various configuration files (108) and/or databases (109). The RWOZ (100) might also be broken into subcomponents such as a voice router (110) and a message service (111), which might be stored on a separate server, or might be stored on the same physical device as one or more of the other components of the RWOZ (100). In some embodiments, some components of an RWOZ (100) might communicate with one another through the message service (111), which might have the ability to queue messages.

In some systems of the type shown in FIG. 1, when a call or other natural language interaction requires processing by a VXML browser (101), the VXML browser (101) might send call audio to both an ASR (103) and an RWOZ (100). The RWOZ (100) might in turn deliver call audio to an agent using a wizard terminal (102). Alternatively, in some embodiments, the agent using the wizard terminal (102) might receive call audio from a private branch exchange (PBX), a switch (112) or other telephony device, rather than from the RWOZ (100). As a further alternative, in some embodiments, the VXML browser (101) might only send call audio to the RWOZ (100) which would then send it to both the agent at the wizard terminal (102) and the ASR (103). In some embodiments, the RWOZ (100) might select an agent to monitor the call by the use of a list of available agents (113), which might be stored in a database (109), in a configuration file (108), or in the memory of the RWOZ (100). In some embodiments, the agent using the wizard terminal (102) might be presented with a screen which is formatted in the manner of FIG. 2. In some embodiments, the ASR (103) might process the audio representation of the call sent by the VXML browser (101) and send a response back to the VXML browser (101). In some embodiments, that response might be comprised of data indicating the ASR's (103) interpretation of the call audio. In some embodiments, the VXML browser (101) might process the data sent by the ASR (103) and arrive at a desired response, which might include transferring the caller to another system, or perhaps playing a response for the caller (107).

In some embodiments, after determining a desired response, rather than executing that response, the VXML browser (101) might send information to the RWOZ (100) including the desired response and/or the data originally sent by the ASR (103). That information might then be sent by the RWOZ (100) to the agent using the wizard terminal (102). Additionally, in some embodiments, further information might be sent to the RWOZ (100) to be forwarded to the wizard terminal (102), including, in some embodiments, what prompt the VXML browser (101) had most recently presented to the caller (107). In some embodiments, the agent using the wizard terminal (102) might be able to indicate to the RWOZ (100) an action that the agent wished to take, and/or his or her interpretation of the call audio. Further, the wizard terminal (102) might also be configured to allow the agent to send additional information, such as remarks, to the RWOZ (100). In some embodiments, the wizard terminal (102) might further be configured to allow the agent to request that actions be taken by the RWOZ (100), such as repeating the audio representation of the call.

In some embodiments, once the agent using the wizard terminal (102) has sent an interpretation of the call audio or desired response to the RWOZ (100), the RWOZ (100) might forward that interpretation or desired response to the VXML browser (101). The VXML browser (101) might then determine what action to take, basing that determination in part on the information provided by the agent. For example, if the agent had indicated an interpretation of the call audio which was different from that provided by the ASR (103), the VXML browser (101) might treat the interpretation provided by the agent as correct, while other embodiments might request that the caller repeat his or her request so that it could be reprocessed by the agent using the wizard terminal (102) and the ASR (103). Alternatively, in some embodiments, if the agent had indicated that the VXML browser (101) should take some action, such as transferring the caller to a different department, the VXML browser (101) might simply take the action specified by the agent, and discard the action which it had determined to take itself.

In some embodiments, in addition to being utilized by the VXML browser, (101) the information transferred by the agent to the RWOZ (100) might also be used for updating models in the ASR (103). For example, in some embodiments, if the agent indicated an interpretation different from that given by the ASR (103), then the RWOZ (100) might identify the data presented to it, perhaps including one or more of: the call audio interpreted by the agent and the ASR (103); the interpretation specified by the ASR (103); the prompt most recently provided by the VXML browser (101); and/or the desired response reached based on the processing by the ASR (103). In some embodiments, that identified data might then be forwarded either to the ASR (103) or to an additional system which was designed to process natural language interactions for incorporation into the ASR's models. It should be noted that what information might be identified could be determined by how the information might be used and how it might be stored. For example, identifying the interpretation specified by the ASR (103) might be useful in some embodiments for updating the ASR (103) so that its interpretations could be made more accurate in the future. Similarly, identifying the response reached automatically based on the interpretation of the ASR (103) might be useful in circumstances where the ASR (103) was reaching correct interpretations, but the responses automatically reached based on those interpretations were often in need of correction by an agent. Of course, it should be understood that the particular uses set forth above are intended only to demonstrate the flexibility of the identification technique, and are not intended to be treated as limiting on how identification might be used. In some embodiments, the incorporation of the data into the ASR's models might occur in real time, that is, with very little (perhaps no) delay between the forwarding of data to the ASR or the additional system and the modification of the models used by the ASR. In other embodiments, the incorporation of the data into the ASR's models might occur in batch mode, that is, based on the analysis of multiple sets of identified data. In embodiments where the incorporation of the data into the ASR's models occurs in batch mode, it might be possible for a human to review the updates. In still further embodiments, instead of, or in addition to, updating the models for the ASR, the interpretations and responses provided by the agent might be used to create ASR models. For example, in some embodiments, calls might be processed by the human agent without input from an ASR, in which case speech data can be collected then used to create ASR models which will be refined as needed. Alternatively, the system might be used with both agent and ASR input, and the data collected during such use be used as the basis for creating new models, rather than updating old ones.

It should be understood that, while the above description of interactions, based on the structure of FIG. 1, is valid for some embodiments, it is by no means an exhaustive recitation of all the embodiments of the invention. For example, some embodiments might route all communications between the VXML browser (101) and other components (e.g., the ASR (103)) through the RWOZ (100), rather than using the RWOZ (100) as an intermediary between the VXML browser (101) and the wizard terminal (102) while allowing the VXML browser (101) to communicate with the ASR (103) directly. Similarly, different embodiments might be built on the exchange of different types of data between the systems depicted in FIG. 1. For example, in some embodiments, the ASR (103) might send a desired action or a desired response to the VXML browser (101), in addition to, or as an alternative to, sending an interpretation of the call audio. Further, in some embodiments, an RWOZ (100) might not identify data including call audio when identifying data for updating the ASR's (103) models. In such embodiments, it might be that call audio was stored in a location separate from the data identified by the RWOZ (100), such as on a server hosting the ASR (103), and that the call audio might be correlated with the data identified by the RWOZ (100) only later. Additionally, in some embodiments the technique of later correlating data with identified data might be used for information other than call audio, depending on the information captured and the capabilities of the systems in that embodiment. In other embodiments, instead of a VXML browser (101), as shown in FIG. 1, a business might substitute some other voice application or system designed for the interactive exchange of data. For example, an interaction might take place using instant messaging, web chat, or any other type of system adapted for the exchange of data. Thus, as the above examples indicate, while FIG. 1 and the related discussion illustrate some possible interactions in some embodiments, those sections are not descriptive of, or limiting on, all possible embodiments of the invention.

Figure 3:
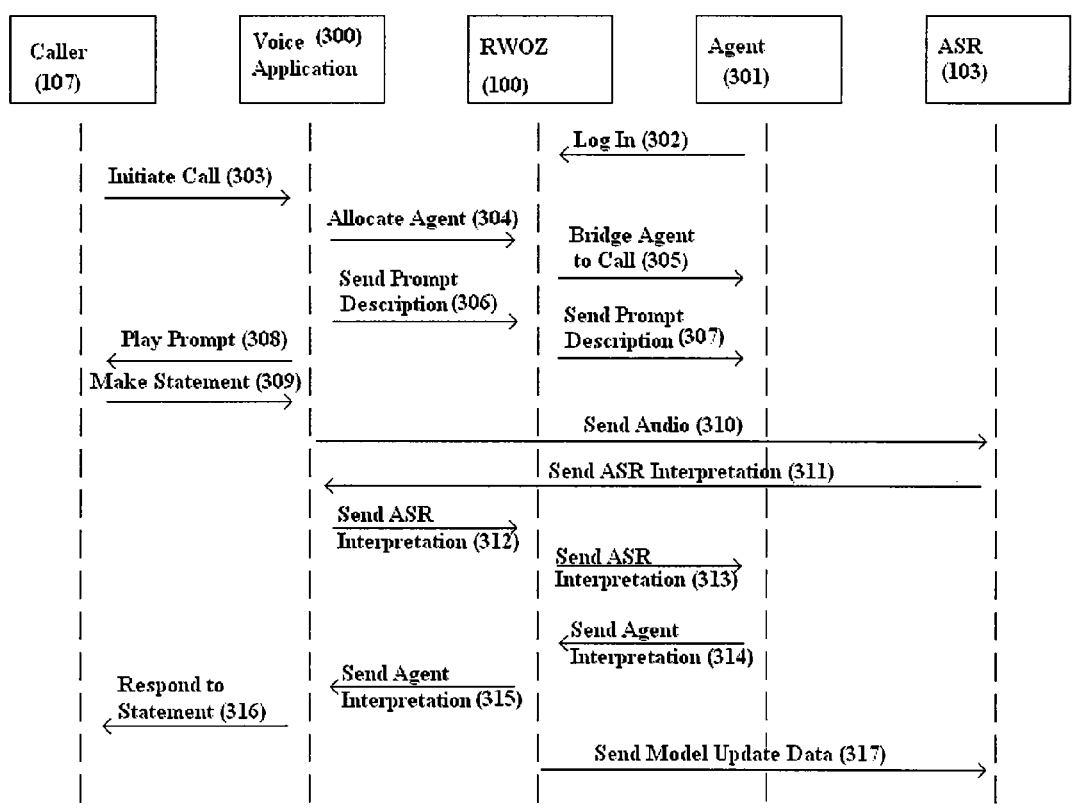
FIG. 3 is a diagram of an exemplary dynamic interaction between the system and a customer.

FIG. 3 shows a portion of the dynamic operation of some embodiments of the invention for a given user input. In an embodiment following FIG. 3, an agent (301) (not shown in FIG. 1) might log on (302) to an RWOZ (100) and inform the system that the he or she was able to process calls. Subsequently, a caller (107) might initiate a call (303) which is answered by a voice application (300). In some embodiments, the voice application (300) might request that the RWOZ (100) allocate an agent (304) to process the call before answering the caller (107). In some embodiments, the request by the voice application (300) to allocate an agent (304) might result in the RWOZ (100) involving the agent in the call, for example, by conferencing the agent into the call and muting the audio input from the wizard terminal so that the caller would not be aware of the involvement of the agent. In some embodiments, the voice application (300) might send a description of the initial prompt (306) to the RWOZ (100), and the RWOZ (100) might then send the agent (301) the description of the initial prompt (307). The voice application (300) might than play the initial prompt (308) resulting the caller (107) hearing a message such as "How may I help you?"

Continuing with the example from the above paragraph, the caller (107) might respond to the initial prompt by making a statement (309) such as "I didn't get my bill of lading." The voice application (300) might then send an audio file representing the statement (310) to the ASR (103). The ASR (103) might then determine an interpretation of the call audio provided by the voice application (300) and send that interpretation (311) to the voice application (300). The voice application (300) might then send that interpretation (312) to the RWOZ (100) which might send that interpretation (313) to the agent (301). The agent (301) might then send his or her interpretation (314) to the RWOZ (100), which might then send the agent's interpretation (315) to the voice application (300). Of course, it should be understood that the data exchanges set forth above are meant to be illustrative and not limiting on the scope of the invention. For example, in some embodiments, rather than simply sending the agent (301) the interpretation of the call reached by the ASR (103), the voice application (300) might also send the agent (301) data representing a response which could be made by the voice application (300) based on the ASR (103) interpretation. Additionally, while FIG. 3 depicts the agent (301) providing an interpretation only after being informed of the interpretation of the ASR (103), the agent (301) might alternatively provide its interpretation before being informed of the interpretation of the ASR (103). Of course, other variations, both in the nature of the data sent, and the sequence of the data communications set forth above, may be developed within the scope of this invention.

Returning to the examination of FIG. 3, in some embodiments, after the voice application (300) had received the agent's interpretation of the call audio, it might play a response (316) for the caller (107) to determine whether the interpretation of the agent (301) or of the ASR (103) was correct. For example, if the voice application (300) was presented with an interpretation from the ASR (103) of "I didn't get my bill" and an interpretation from the agent (301) of "I didn't get my bill of lading," the voice application (300) might play a response for the caller (107) asking if the caller (107) would like to be transferred to the billing department, if the problem was that the caller (107) didn't get a bill, or if the caller (107) would like to be transferred to the printing department, if the problem was that the caller (107) didn't get a bill of lading. Finally, in some embodiments, the RWOZ (100) might analyze data related to the call including one or more of the ASR's interpretation, the call audio, and/or the agent's interpretation, and use that data to update the models used by the ASR (103). In some such embodiments, the RWOZ (100) might then send those updated models and/or data to update existing models (317) to the ASR (103). In other embodiments, the RWOZ (100) might simply identify the data related to the call and that data would later be processed and the models of the ASR (103) updated.

While the above example sets forth an interaction which might take place in some embodiments of the invention, there are many variations on the embodiments and interactions described above which could be practiced by one of skill in the art. For example, some embodiments of the invention might allow the agent (301) to react to the audio provided by the voice application (300) at any time, even before being informed of the interpretation derived by the ASR (103). Further, various embodiments might have different types of content in the communications between the different components. For example, in some embodiments, the ASR (103) or agent (301) might specify the actual content of a response to be given to a caller (107), such as "How may I help you?" while in other embodiments the ASR (103) or agent (301)

might specify an action code of some kind, such as "NEED_PRODUCT_NAME" or "TRANSFER_TO_BILLING." Additionally, different methods of updating the ASR (103) or devices used to process natural language communications based on alternate responses from the agent (301) might be used. For example, some embodiments might update hidden Markov models, which are statistical models which output a sequence of symbols or quantities, within the ASR (103) in real time while other embodiments might store data, either in the ASR (103) or alternate systems, which could be used to update the ASR (103), perhaps by automated batch processing, perhaps by humans who would write new models to be followed by the ASR (103), or perhaps by some combination of the two, with certain updates being made in real time, others being automatically processed, and still others being made subsequently by humans, depending on the requirements of the system. Other embodiments might have different methods of updating, such as updating the grammar used by the ASR (103). Embodiments might also differ in how they interact with the agent (301). For example, in the case where the agent (301) agrees with the ASR (103), some embodiments might require the agent (301) to sign off on the ASR's choice, while other embodiments might have a time-out which would automatically accept the ASR's conclusion when the agent (301) does not promptly indicate an alternative, while still other embodiments might request that the customer repeat his or her request when the ASR (103) and the agent (301) send different conclusions to the voice application (300), while still other embodiments might automatically accept the response provided by the agent (301) and reject that determined based on processing by the ASR (103), or vice versa. Different embodiments might also communicate different information. For example, in some embodiments, the agent (301) would only be provided with an audio recording of the caller's statement, while other embodiments might provide the agent (301) with an audio recording and an automatic transcription of the caller's statement. Still other embodiments might provide an agent (301) with an automatic transcription of the caller's statement only.

Additionally, it should be understood that, while the above example was discussed in terms of an ASR (103), voice application (300), a caller (107) and an RWOZ (100), the teachings of this disclosure are generalizable, and can easily be applied to other contexts by one of ordinary skill in the art. For example, and not by way of limitation, in the above discussion, the RWOZ (100) might be replaced with any other type of intermediary system, the ASR (103) might be replaced by any other type of computerized input interpreter, and the voice application (300) might be replaced by any other type of automated interaction system. Thus, the teachings of the present disclosure could be applied in alternative contexts, such as training a computer system such as a neural network to perform a given input processing task, in which case, the agent in the system might not even be a human agent, and the agent terminal might be, rather than a computer workstation, a device I/O port utilized by a training computer.

Moving beyond the architecture discussed above, FIG. 2 depicts a possible interface which might be presented to an agent in some embodiments of the invention. In some embodiments, the interface might be accessed through an agent's web browser. In other embodiments, the interface might be an interface to an application which was locally hosted on a terminal used by the agent, such as the wizard terminal (102) of FIG. 1. In the interface of FIG. 2 an agent is presented with the prompt which was most recently communicated to the customer in the current prompt box (200), a transcription of the customer's last statement provided by the ASR in the recognition result box (201), a series of clarification buttons (202) with clarifications desired based on processing by the ASR (203) highlighted. The agent is also presented with a group of destination buttons (204) showing potential systems the call could be routed to, and with a remarks box (205) in which the agent can write comments about the statement made by the customer. Finally, the agent is presented with a group of remark buttons (206), which the agent can use to indicate that the caller has certain characteristics, that is, distinguishing traits, such as being in a bad mood, having a heavy accent, or being an employee of the business.

FIG. 2 shows a user interface such as that which might be presented to the agent directly after an initial prompt is given. The current prompt box (200) contains the phrase "How may I help you?" indicating that the phrase "How may I help you?" was the phrase most recently communicated to the customer. The recognition result box (201) contains the phrase "(noinput)" and the clarification button labeled "NO RESPONSE" (203) is highlighted, indicating that the voice application has not received any statements by the customer since the prompt "How may I help you?" was given. None of the destination buttons are highlighted because the ASR has not had a chance to reach an interpretation of a statement upon which a desired response might be based.

FIG. 2A extends FIG. 2 by showing a user interface which might be presented to an agent after the customer responds to the initial prompt of "How may I help you?" FIG. 2A specifically shows how the interface presented to the agent might change based on input of data and changes by the system. Thus, the current prompt box (200A) of FIG. 2A is identical to the current prompt box (200) of FIG. 2, since the system has not said anything new to the customer since the phrase "How may I help you?". However, the recognition result box (201A) in FIG. 2A is different from its equivalent in FIG. 2 because, by the time FIG. 2A is shown, the customer has responded to the phrase shown in the current prompt box (200), (200A), and the ASR has interpreted the response to be "I'm having trouble printing reports." Further, the clarification buttons (202A) of FIG. 2A are different from those in FIG. 2 in order to indicate that a statement from the customer has been received and no clarification is required based on the interpretation reached by the ASR. The destination buttons (204A) of FIG. 2A have also changed from the destination buttons (204) of FIG. 2. In FIG. 2A, the destination button marked Technical Support is highlighted, in order to show that, based on processing by the ASR, the system has determined that the customer has a problem with a printer, and that the system's desired response (203A) is therefore to route the customer to Technical Support.

In some circumstances, the agent might concur with the desired response reached based on the ASR's interpretation of the customer's statement. However, assume that the customer, after hearing the prompt "How may I help you?" stated "I'm having trouble printing reports from your web site." Assume further that the ASR did not register the portion of the response dealing with web sites, and so processed the response as "I'm having trouble printing reports," and so the agent was presented with a display like that presented in FIG. 2A. In such a scenario, the agent might have decided that the ASR made a mistake by comparing the ASR's transcription of the customer's statement with the call audio. The agent in that case might click on the destination button marked Website Support in order to transfer the caller to a system providing web site support, rather than the one selected based on the interpretation by the ASR. The agent might also describe the caller's speaking style in the remarks box, which in the interface presented in FIG. 2A is a box (an element of a graphical user interface separated from the remainder of the user interface by a border), for instance by writing that the caller spoke very fast, or stating that the caller slurred his or her words. In some embodiments of the invention, the agent's choice might be transferred to voice application through the RWOZ as soon as the agent clicked on one of the destination buttons. In other embodiments, the agent might be provided with a submit button, not shown in FIG. 2A, which the agent might click after deciding on an alternate response. In other embodiments, the agent might be given a set amount of time to decide on a course of action, and the state of the agent's interface might be sent to the RWOZ after the set time had elapsed.

FIGS. 2 and 2A are intended to be illustrative only of interfaces which might be presented to the agent in various embodiments of the invention and it should be understood that different embodiments might present interfaces which differ radically from those depicted in FIGS. 2 and 2A. For example, some embodiments might present the agent with options which are relevant only to the last prompt presented to the caller. Other embodiments might present the agent with all possible options and let the agent decide which options are relevant. In some embodiments, the system might inform an agent of all possible responses, but might have certain responses, which are not relevant to the last prompt presented to the caller, inactivated so that the agent can not send those responses to the RWOZ. In some embodiments, the system might display certain responses which are generally relevant, such as "yes," "no," "silence," and/or "transfer to operator." Further, some embodiments of the invention might only present user interfaces to an agent when the ASR has some difficulty in determining a correct course of action, or is unsure what response to make. Other embodiments might have an agent continuously monitoring each conversation and examining every response supplied by an ASR. Still other embodiments of the invention might use various combined approaches. For example, some embodiments of the invention might not interact with an agent until an ASR was unable to determine an appropriate response with a given confidence, at which point the agent would continuously monitor the customer's communication. Additionally, some embodiments might have the capacity to transfer a customer call to an operator. Such embodiments might make such a transfer, for example, when it is not possible to determine an appropriate response to the customer, or in cases where either the agent, or the ASR, or both, indicate that the customer's inquiry has been inappropriately routed.

Further embodiments might move beyond the scenarios and architectures set forth above and be utilized in other configurations for other tasks. For example, some embodiments of the invention might have multiple ASRs. In such embodiments, ASRs might perform validation and checks on one another in a manner similar to the agent, thus minimizing the need for human interaction with the system. Other embodiments might allow user interfaces to be determined by voice applications provided by businesses seeking to deploy interactive voice response systems, thus increasing reusability. In some embodiments, the interfaces might consist of a standard set of controls, e.g., the controls discussed above with respect to FIGS. 2 and 2A, and the specific controls and buttons provided might be automatically determined by the script of a voice application. Further, in addition to (or as an alternative to) allowing interfaces to be configurable by businesses seeking to deploy interactive voice response systems, other configurable interfaces might allow an agent to make decisions as to how information would be presented in the interface.

To provide a concrete instance of certain of the principles and features set forth above, consider the systems and methods described below in what will be referred to as an "exemplary embodiment." It should be realized that the exemplary embodiment set forth below is not, and is not intended to be, an exhaustive description of all systems, methods, and computer readable media within the scope of this application. Moreover, it should be realized that the disclosure of the exemplary embodiment below actually includes disclosures of multiple methods, systems and computer readable media, and that not all embodiments within the scope of this application will include each of the methods, systems and computer readable media described in the context of the exemplary embodiment. Thus, the disclosure of the exemplary embodiment below should be understood to be illustrative only, and not limiting.

The exemplary embodiment is discussed in the context of a business seeking to train a recognizer for an interactive voice response system using a combination of natural language understanding and human input. For the sake of comprehension, the exemplary embodiment is discussed in the context of a relatively simple application: natural language call routing. That is, the exemplary embodiment is used to develop a computerized system which, in response to a caller's request, will transfer that caller to the correct department or application (e.g., billing, shipping, etc. . . . ). Further, while the above discussion taught multiple techniques for integrating an agent into an automated system (e.g., allowing the agent to override decisions of the automated system, requesting new information when the agent and the automated system are not in agreement, etc. . . . ), the discussion of the exemplary embodiment will focus on techniques in which the agent monitors and responds to statements made by a caller. For the sake of easy understanding of the description of the exemplary embodiment, the discussion below will refer to the figures already described, e.g., the system of FIG. 1 and the interfaces of FIGS. 2 and 2A. It should be understood that FIGS. 1, 2 and 2A are used in this context only to make the explanation of the exemplary embodiment more concrete, and that systems and interfaces such as illustrated in FIGS. 1, 2 and 2A can have more or different capabilities or uses than described below in the context of the exemplary embodiment.

The use of the exemplary embodiment begins with creating an interface which can be presented to the agent. This process can be undertaken in several ways. For example, there might be an existing voice application which is to be improved through the use of human input. In such a scenario, a standard interface could be customized for the already created voice application, perhaps by using a computer program which would analyze the potential responses which could be implemented by the voice application during the interaction, examine the capabilities of the existing system, and would then automatically generate an interface of the type depicted in FIGS. 2 and 2A.

Once the interface and the voice application had been created, parallel call handling by an agent and the computerized system could begin. To illustrate this parallel call handling, reference will be made to the system of FIG. 1. First, the agent logs into the wizard terminal (102) and informs the RWOZ (100) that he or she is ready to begin processing calls. When a call is received by the IVR containing the VXML browser (101), the RWOZ (100) selects an agent from the wizard list stored in the database (109) to handle the call. As discussed previously, such selection could use any number of algorithms, such as always selecting the best available agent as indicated by call disposition time, or allocating the agents who produce the most satisfied customers to callers fitting a profile that indicates that they are susceptible to up-sell or cross-sell proposals. Whatever the selection algorithm used, once the selection has been made, in the exemplary embodiment the RWOZ (100) instructs the switch (112) to conference the agent using the wizard terminal (102) onto the interaction between the caller (107) and the IVR using a computer telephony integration (CTI) program. The RWOZ (100) would then mute the audio input from the wizard terminal (102) so that the agent would not inadvertently alert the caller (107) to his or her presence. This procedure, including conferencing and muting can help improve the modularity of the exemplary embodiment, as it allows the agent and the RWOZ (100) to be integrated into existing systems with a minimum of re-engineering and customization.

Additionally, the configuration files (108) could be used to increase the reusability of the RWOZ (100) as well. For example, in some embodiments, the RWOZ (100) might include java servlets which are configured to produce VXML documents. The servlet might read information describing the call flow for a caller interaction (e.g., what prompts to play, what choices are available, and other similar information) from the configuration files, and then use that information during an interaction, along with the ASR and agent interpretations, to produce VXML to send to the IVR for the next action and/or prompt. Thus, the system might be designed in such a way that all that would be necessary to deploy a new application would be a new set of configuration files.

In the exemplary embodiment, once the agent has been conferenced in, the RWOZ (100) records all statements made by the caller (107), all responses implemented by the IVR and all responses provided by the agent using the wizard terminal (102) into the database (109). In the exemplary embodiment, the data in the database (109) is organized into records, which are themselves organized into fields, with each field containing a different aspect of the call. For example, the records might comprise fields such as: the statement last made by the caller, the response determined by the VXML browser (101), and the response determined by the agent using the wizard terminal (102). Note that, in the exemplary embodiment, the data is not identified when it is originally stored in the database. Instead, in the exemplary embodiment, data is identified at predefined times (e.g., 2 a.m. on Saturdays, when it is not likely that many callers will try to use the system) by querying the database to retrieve all records in which the field representing the response implemented by the IVR is different from the field representing the response determined by the agent. That identified data could then be used to update the IVR, following the theory that borderline data (i.e., data representing statements which could not easily be understood, leading to a disagreement between the IVR and the agent regarding the response to be implemented) is more valuable for improving an automated system than good data (i.e., data representing statements which were likely interpreted correctly by the automated system).

As stated previously, the exemplary embodiment should be considered to be illustrative only, and not limiting. For example, while it discussed identifying which took place only at predefined times rather than during interactions, it is possible alternatively to identify data in real time (e.g., during the interaction with the caller) rather than subsequently. For example, identifying might comprise saving the records indicating disagreement between the agent and the IVR to a separate file so they could be easily retrieved, rather than saving them with the other records in the database. Additionally, in systems which use real-time identifying, the identified data might be used to recompile the models used by the recognizer as soon as it was created, so that the system could be learning constantly. Further, data could be identified based on different criteria than that discussed in the context of the exemplary embodiment. For example, the agent might be allowed to specify when data should be identified (e.g., by writing remarks regarding the data), or data could be identified automatically based on factors other than divergence between the response determined by the agent and the response implemented by the IVR (e.g., data could be identified based on a confidence level in the response automatically determined by the IVR, based on an unusual nature of the request, or based on some other factors entirely). Thus, to reiterate, the exemplary embodiment should be understood are illustrative only, and not limiting.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in operation which may be resorted to are intended to fall within the scope of the invention.

The invention claimed is:

1. A method comprising the steps of:
 a) receiving a statement during an interaction with an automated response system;
 b) sending the statement to an agent for response;
 c) receiving:
  i) a first response to the statement, wherein the first response to the statement is determined by the agent based on the statement; and
  ii) a second response to the statement, wherein the second response to the statement is determined automatically based on the statement;
 d) implementing the first response to the statement
 e) storing data comprising the first response and the second response;
 f) terminating the interaction with the automated response system; and
 g) subsequent to termination of the interaction, determining whether to identify the stored data based at least in part on the second response, wherein the second response was not implemented in response to the statement.

2. The method of claim 1 wherein the first response is determined by a live agent; wherein the statement is received from a caller; and wherein the second response is determined automatically; wherein the second response is not implemented.

3. The method of claim 1 wherein storing data comprises storing data in a database comprising a plurality of records having a first field corresponding to the first response and a second field corresponding to the second response and wherein selectively identifying comprises querying the database.

4. The method of claim 3 wherein the querying step comprises selecting records in which the first field is different from the second field.

5. The method of claim 1 wherein selectively identifying takes place automatically.

6. The method of claim 1 wherein selectively identifying the stored data comprises altering the stored data.

7. The method of claim 6 wherein altering the stored data comprises moving the stored data.

8. The method of claim 6 wherein altering the stored data comprises augmenting the stored data.

9. A method comprising the steps of:
a) receiving a statement from a caller during an interaction between the caller and an automated response system;
b) involving an agent in the interaction, wherein involving the agent comprises transparently conferencing the agent into the interaction such that the caller is not aware of the agent's involvement in the interaction;
c) simultaneously providing the statement to the agent and to an automated speech recognizer during the interaction between the caller and the automated response system;
d) receiving:
   1) a first interpretation of the statement from the agent;
   2) a second interpretation of the statement from the automated speech recognizer;
e) implementing a response to the statement, wherein the response to the statement is determined using either the first interpretation of the statement or the second interpretation of the statement;
f) storing data comprising the first interpretation of the statement and the second interpretation of the statement;
g) terminating the interaction between the caller and the automated response system; and
h) subsequent to termination of the interaction between the caller and the automated response system, determining whether to identify the stored data based on information comprising an identifying interpretation of the statement, wherein the identifying interpretation is either the first interpretation of the statement or the second interpretation of the statement, and wherein the identifying interpretation was not used in determining the response to the statement.

10. The method of claim 9 wherein involving the agent comprises muting an audio input.

11. The method of claim 9 wherein involving the agent comprises selecting the agent from an agent list.

12. The method of claim 9 wherein:
a) the agent is a live agent; and
b) in the event the first interpretation of the statement and the second interpretation of the statement are not the same, the response is determined using the second interpretation of the statement.

13. The method of claim 9 wherein:
a) determining whether to identify the stored data comprises determining whether the first interpretation of the statement is different from the second interpretation of the statement;
b) the stored data is identified if the first interpretation of the statement is different from the second interpretation of the statement; and
c) if the stored data is identified, it is used to update the automated speech recognizer.

14. A system comprising:
a) an agent terminal;
b) an automated interaction system;
c) a reusable intermediary system;
d) a computerized input interpreter; and
e) a computer readable medium having stored thereon computer executable instructions operable to:
   configure the reusable intermediary system to allow an agent to log into the reusable intermediary system using the agent terminal;
   configure the automated interaction system such that, in response to an external input, the automated interaction system sends a request to the reusable intermediary system for allocation of a resource for processing the external input;
   configure the reusable intermediary system such that, in response to the request from the automated interaction system, the reusable intermediary system integrates the agent into processing the external input;
   configure the automated interaction system to send a response to the external input both to the source of the external input and, through the reusable intermediary system, to the agent terminal;
   configure the automated interaction system to send a second external input having the same source as the first external input to the computerized input interpreter, and to the agent terminal via the reusable intermediary system;
   configure the computerized input interpreter to send, to the automated interaction system, a first output generated in response to the second external input;
   configure the automated interaction system to send the first output to the agent terminal via the reusable intermediary system;
   configure the reusable intermediary system and the agent terminal such that the agent terminal allows the agent to, using the agent terminal, determine a second output based on the second external input wherein the agent terminal and reusable intermediary system are configured such that the agent is allowed, using the agent terminal, to determine the second output before the first output is sent to the agent terminal, and such that the second output is sent from the agent terminal to the automated interaction system via the reusable intermediary system;
   configure the automated interaction system to send a second response to the source of the external input based on the first output and the second output; and
   if the first output and the second output are different, update the computerized input interpreter based at least in part on the second output.

15. A method of operating a system comprising an IVR, an agent terminal, a reusable Wizard of Oz system, and an automatic speech recognizer comprising the steps of:
a) allowing an agent to log into the reusable Wizard of Oz system using the agent terminal;
b) receiving a call from a caller at the IVR;
c) in response to a request from the IVR, bridging the agent to the call;
d) from the IVR, playing a prompt for the caller;
e) sending a description of the prompt from the IVR to the agent via the reusable
Wizard of Oz system and the agent terminal;
f) receiving, at the IVR, a statement from the caller;
g) from the IVR, sending the statement to the automatic speech recognizer;
h) from the automatic speech recognizer, sending an interpretation of the statement to the IVR;
i) from the IVR, sending the interpretation of the statement to the agent via the reusable Wizard of Oz system and the agent terminal;
j) allowing the agent to determine an agent interpretation of the statement via the agent terminal;
k) sending the agent interpretation of the statement from the agent terminal to the IVR via the reusable Wizard of Oz system;
l) based on the interpretation of the statement, determining a response to the statement from the caller;
m) via the IVR, responding to the statement from the caller using the determined response;

n) via the reusable Wizard of Oz system, automatically saving the interpretation of the statement and the agent interpretation of the statement;

o) if the interpretation of the statement and the agent interpretation of the statement are different, updating the automatic speech recognizer with a model based at least in part on the agent interpretation of the statement.

* * * * *